UNITED STATES PATENT OFFICE.

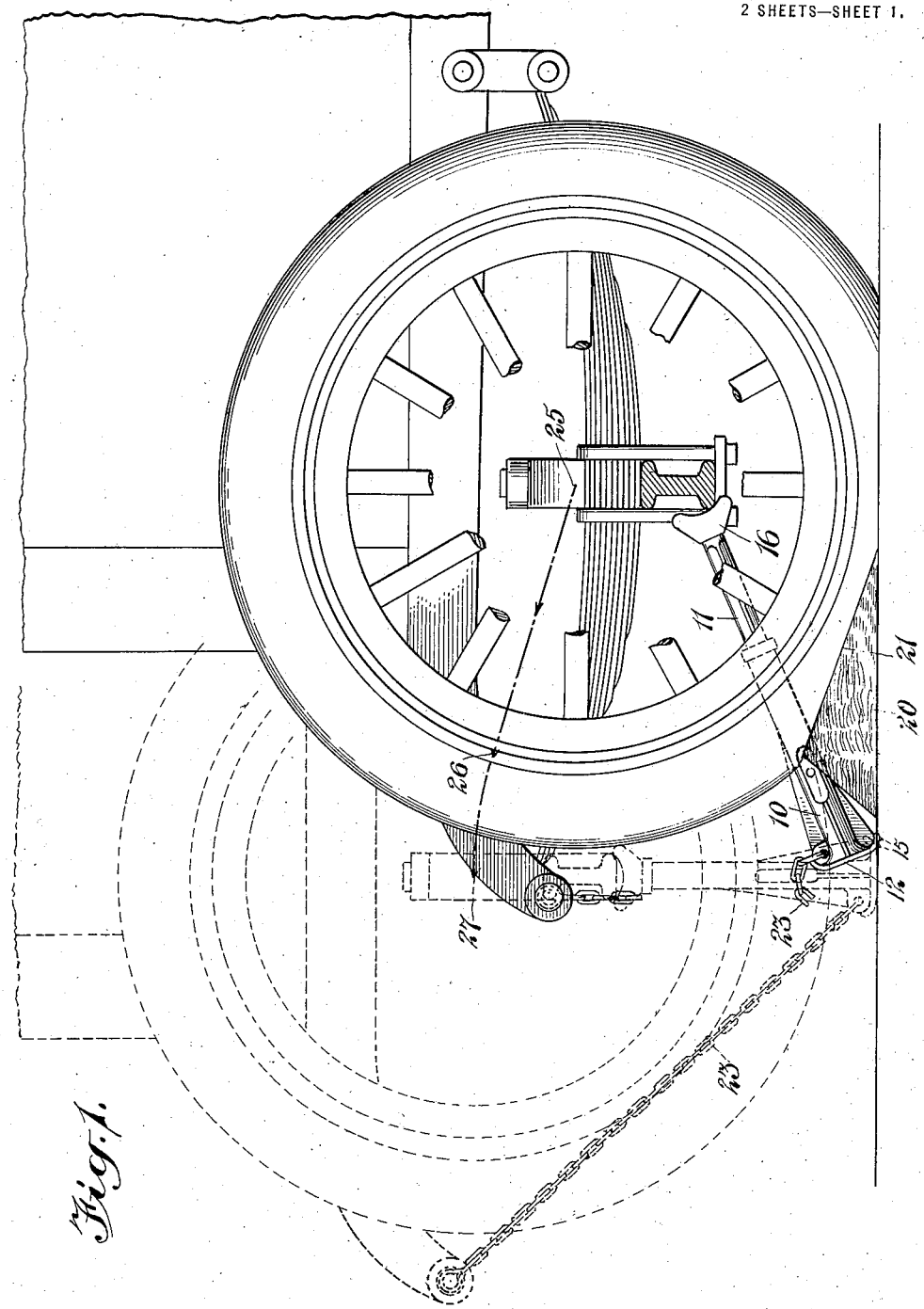

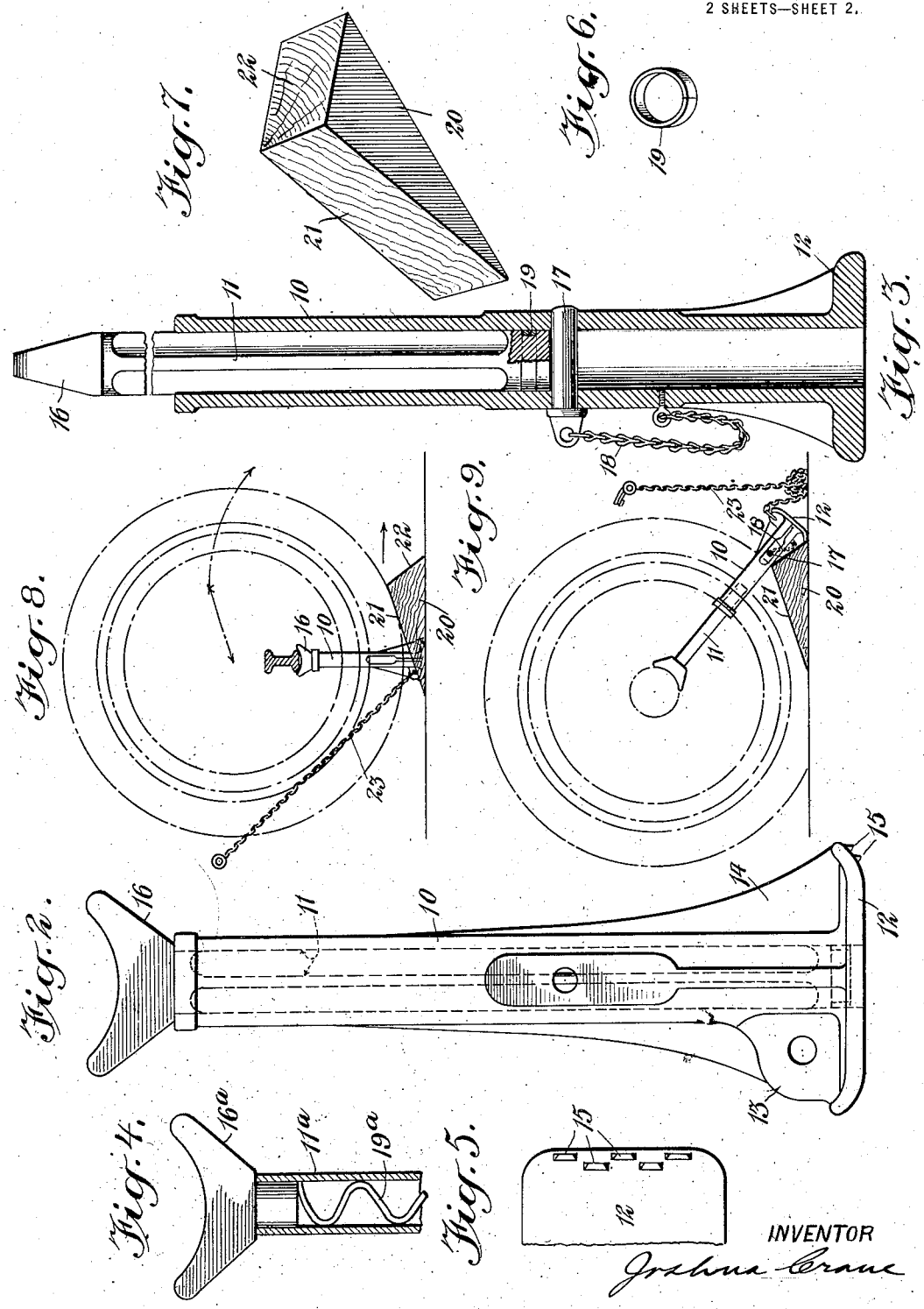

JOSHUA CRANE, OF WESTWOOD, MASSACHUSETTS, ASSIGNOR TO COPLEY MOTOR DEVICES CO., OF BOSTON, MASSACHUSETTS, A CORPORATION OF MASSACHUSETTS.

VEHICLE-JACK.

1,356,697.          Specification of Letters Patent.      Patented Oct. 26, 1920.

Application filed December 23, 1918. Serial No. 267,917.

*To all whom it may concern:*

Be it known that I, JOSHUA CRANE, a citizen of the United States, and a resident of Westwood, in the county of Norfolk and State of Massachusetts, have invented certain new and useful Improvements in Vehicle-Jacks, of which the following is a specification.

This invention has for its main object the provision of simple, efficient, inexpensive, and easily positioned and operated mechanism whereby the forward or rearward movement of a vehicle under its own or outside power may be utilized to produce a lifting or elevating of a wheel thereof, and movements of the parts to such a position that the wheel is supported clear of the ground and free to rotate. My invention is particularly applicable for use in connection with heavy automobiles or with such cars or other vehicles where the design of the body, chassis, or other parts renders it very difficult or inconvenient to oscillate the ordinary jack lever or apply the necessary power thereto.

I am aware that devices have been designed including a swinging strut or arm extending from the vehicle axle to the ground in an inclined position and movable to a vertical position to lift the vehicle wheel as the vehicle moves forwardly or rearwardly. Such prior devices with which I am familiar have failed to accomplish satisfactory results due to one or more of the following reasons. The distance through which the axle must be raised from deflated tire position to permit the substitution of an inflated tire is so great in respect to the distance of the axle above the ground that the strut, arm, or jack must be inclined to a comparatively small angle with the ground and the vertical component of the necessary axle movement is so large in respect to the horizontal component that difficulty is encountered in moving the vehicle horizontally under its own power to the desired distance from a standing start. Although this may be accomplished in lifting the front or non-driving wheels of an automobile, it becomes still more difficult in lifting one of the driving wheels as the differential permits this wheel to spin before the wheel with its flat tire is raised and supported by the swinging of the jack from inclined to vertical position. Even though the raising of the wheel be successfully accomplished there is no means for getting it down off the jack by the use of the power of the vehicle for if one driving wheel is raised neither driving wheel has any tractive action on the ground. It is difficult to push along a heavy car until the jack topples over and drops the raised wheel to the ground.

In my improved mechanism, I employ a member presenting an inclined surface up which the vehicle wheel to be lifted may roll, and a device to which the weight is transferred when in this elevated position, and from which it may be retransferred to said first mentioned member when it is desired to lower the wheel to the ground.

Although the details of the parts and their relative proportions and positions may be varied as hereinafter pointed out, the best results are secured with the parts substantially as follows: The inclination of the surface up which the vehicle wheel rolls is sufficiently low to permit an easy movement of the vehicle without the application of too great power and the elevation of the high point of the inclined surface is a little greater than the difference in height of the axle with the tire deflated and fully inflated. The jack is of a minimum total effective length a little greater than the normal elevation of the axle when the tire is fully inflated and it may be extended to such a length that it will reach from the axle to the ground at the opposite side of the high point of the inclined surface member when the tire is deflated and the inclined surface is in position for the wheel to roll up the same. The two telescoping members of the jack are so connected that as the wheel rolls up the inclination, the jack swings about its lower end as a pivot and shortens without taking the load, at least to any material extent, until the axle reaches a position adjacent to a point vertically above the high point of the inclination. Thereafter little if any further lifting movement of the axle takes place, the movement being essentially a horizontal one as the jack swings through the final portion of its movement to vertical position and without further telescoping. During this final movement, the weight of the axle is transferred to the jack and the low point of the wheel moves beyond the high point of the inclination. The inclined surface member may then be readily removed leaving the vehicle axle supported on the jack with the latter in substantially vertical position. When the desired change of tires or other work for which the wheel was raised has been accomplished, the inclined surface member may be reinserted but with the inclination facing in the opposite direction. The wheel may secure sufficient tractive engagement with the inclined surface, particularly if an inflated tire has been substituted for a flat one and the vehicle under its own power may again roll up the inclination over the high point and down to the ground, thus tipping the jack over and leaving it behind.

In the accompanying drawings I have illustrated one embodiment of my invention and shown somewhat diagrammatically the method of operation thereof, but it will of course be understood that the details of this form may be varied and that the relative movements and operations of the parts may vary somewhat in different forms and under different conditions of use.

In these drawings:

Figure 1 is a side elevation of a portion of a vehicle showing in solid lines the position of the parts before the raising of the axle, and showing in dotted lines the position with the axle supported on the jack.

Fig. 2 is a side elevation of the jack itself with the parts telescoped to the limiting position for the front axle.

Fig. 3 is a section at right angles to the plane of Fig. 2 but with the parts telescoped to the position for the rear axle.

Fig. 4 shows a modified detail of construction.

Fig. 5 is an inverted plan view of a portion of the base.

Fig. 6 is a perspective view of a friction ring.

Fig. 7 is a perspective view of an inclined surface member up which the wheel may roll.

Fig. 8 is a somewhat diagrammatic view, showing the parts in position for the lowering of a front wheel, and Fig. 9 is a similar view with the parts in position for the raising of a rear wheel.

The jack illustrated includes two telescopic members 10 and 11 of sufficient size and strength to provide efficient support for a vehicle axle. The outer member 10 is shown as being substantially tubular with a base 12 for engagement with the ground. The opposite edges of the base may be curved upwardly to a slight extent to provide a better support when the jack is in an inclined or tilted position. Adjacent to the base there is provided means for the attachment of a cable, chain, or other flexible member of the desired tensile strength, such means being shown as a perforated flange 13 which may be integral with the base 12 and the body of the member 10 and may extend upwardly alongside of the body to any desired distance. A somewhat similar flange 14 may be employed on the opposite side to act as a reinforcement and the under side of the base at this edge may have calks or projections 15 to prevent the base from slipping while moving from an inclined to a vertical position. These parts are illustrated as being of an integral casting of malleable iron, although other designs and materials might be employed provided they give the required strength and rigidity and serve the desired functions.

The inner member 11 is made to telescope with the outer member 10 and has at its upper end a head or saddle 16 so designed as to facilitate its proper engagement with the under side of the axle or other chassis part. I have shown the inner member of a casting of skeleton form with the head or saddle 16 integral therewith, although I do not wish to be in any way limited to such form, material, or method of manufacture.

In Fig. 4 I have shown a saddle 16ª in the form of a metal casting with a cylindrical lower end projecting into and rigidly secured to the upper end of an inner member 11ª formed of a piece of tubing.

The two main members of the jack may be made so as telescope to any desired minimum length in accordance with the elevation of the axle of the car above the ground. The jack may be made of varying heights to adapt it to different makes of cars or adjustable stops may be made to adapt it to different cars. As shown, the two members are intended to telescope until the head or saddle 16 of the inner member rests directly upon the upper end of the outer member when the jack is in position beneath the front axle of the car. Ordinarily this front axle is lower than the rear axle due to the steering knuckles and other causes and therefore the jack is constructed to telescope to either one of two minimum lengths. When the jack is used with the rear axle, means are provided for preventing the parts from telescoping to the extent shown in Fig. 2 or past another predetermined limit. In Fig. 3 this limiting means is shown as a pin 17 detachably disposed within diametrically opposed openings in the wall of the outer member. The casting is of such form that these holes may be drilled at different elevations to adapt the device to axles of different heights. I have shown the pin as permanently connected to the jack member 10 by a short flexible chain 18 so as to prevent it from being misplaced or lost. Stops other than the pin 17 may be employed and I may provide two or more sets of openings at different elevations to receive this pin and thus give greater adjustability for the same car or adapt it for different cars.

In connection with the two main members I provide yieldable means for restricting or retarding the free and easy telescoping of the members, particularly during the shortening of the jack. This means may assume various different forms but in Figs. 3 and 6 I have shown such means as a spring friction ring 19 setting in a groove in the periphery of the inner member adjacent to the lower end of the latter. This ring is held against longitudinal movement in respect to the inner member and by reason of its resiliency it presses out against the inner surface of the outer member and makes a frictional resistance to prevent the free relative movement of the parts. Other resilient yieldable connections for holding the parts extended and permitting of their relative telescoping movement during the rolling of the wheel up the inclined surface may be employed, such for instance, as a coil spring 19$^a$ within such a tubular inner member as is shown in Fig. 4 and having its lower end engaging a stop at the bottom of the outer member and its upper end engaging a stop, as for instance, the saddle at the upper end of the inner member.

In connection with the jack proper there is employed a separate member presenting an inclined surface of sufficient width to permit the wheel to roll up the same and of a sufficient height to effect the desired elevation of the axle during such rolling movement. This member may assume various different forms but it is preferably a substantially triangular block of wood 20 presenting an inclined face 21 of the desired comparatively low pitch and a second face 22 which may be very much more abrupt even to the extent of being substantially at right angles to the base or under surface.

In the use of my improved construction the block 20 is placed in position in the plane of the wheel so that when the wheel is moved in the desired direction it will roll up the inclined surface 21. The two members of the jack are extended to the desired distance, the base being placed on the ground at the side of the high point of the jack opposite to the axle and the saddle is placed against the axle as shown particularly in Fig. 1. The lower end of the base is connected to some part of the chassis, as for instance, the connection or toggle at the end of a spring by means of a chain 23 or other flexible tensile member. As the car is moved under its own power the center 25 of the axle will move along a substantially straight line 25, 26 parallel to the inclined surface 21 until the center of the axle reaches a point vertically disposed above the high point of the block 20. During this movement the base of the jack will remain substantially stationary while the saddle remains in engagement with the axle and the two parts are slowly telescoped without the jack taking any material part of the load. When the center of the axle reaches the point 26, the jack should have been telescoped substantially to its limiting position and as the car moves farther under its own momentum, the center of the axle will move from the point 26 to the point 27 without any material vertical movement or possibly without any and the entire or substantially entire weight of the wheel and axle will be transferred to the jack. The chain 23 should be of such length that when the jack reaches a vertical position as shown in dotted lines in Fig. 1, the chain will be taut. Should the car move any farther under its own momentum the chain will drag the base of the jack along with the vehicle while the upper end of the jack remains in engagement with the axle and the jack will thus retain its axle supporting position. As the center of the axle moves laterally from the point 26 to the point 27 it will evidently be moving beyond the high point of the block 20 and thus when the jack comes to a vertical position the block 20 may be readily removed leaving the wheel free to turn or be removed. When it is desired to lower the wheel and remove the jack the block is reinserted beneath the tire but facing in the opposite direction as shown in Fig. 8. The extent to which the block can be inserted will of course depend upon whether or not an inflated tire was substituted for a flat one but in any event, the tire will have a sufficient tractive grip on the block so that when the car is started toward the right from the position shown in Fig. 8 the wheel will travel up the inclined surface 21 and down the inclined surface 22 on the ground, leaving the jack behind. It is of course understood that the upper end of the chain 23 is not permanently connected to the vehicle body but is freely detachable therefrom. Any suitable form of hook, link, or other readily detachable connection may be employed.

Having thus described my invention what I claim as new and desire to secure by Letters Patent is:

1. An apparatus for raising a motor vehicle wheel having a deflated pneumatic tire clear of the ground, including a jack having two yieldingly connected telescoping parts of a total effective minimum length equal to the elevation to which it is desired to raise the axle above the ground and extensible to permit the engagement of one part with the vehicle axle and the other with the ground when the jack is in an inclined position, and a wedge presenting an inclined surface up which the vehicle wheel may roll to raise the axle and swing the jack from inclined toward vertical position and telescope the parts to the minimum length, the high point of the wedge being so positioned in respect to the base of the jack that the axle after passing over said high point may move by the momentum of the car in a substantially horizontal direction during the final swinging but non-telescopic movement of the jack to vertical position, whereby the axle is supported on the jack and the wedge may be removed.

2. A vehicle jack having a minimum length equal to the desired raised elevation of the vehicle axle and including two slidably and yieldably connected sections adapted to be inserted in extended and inclined position beneath the axle and automatically telescoped to said minimum predetermined length during a lateral and upward movement of the vehicle axle and the swinging of the jack from said inclined to a vertical position.

3. A device as defined in claim 2, having means connecting the base of the jack to a portion of the vehicle to limit the horizontal movement of the vehicle in respect to the base of the jack.

4. A device as defined in claim 2, having a flexible tension member for connecting the base of the jack with a portion of the vehicle and limiting the horizontal movement of the vehicle in one direction in respect to the base of the jack.

5. An auto jack, including two yieldingly telescoping sections, one having a base adapted to engage with the ground, and the other having a saddle adapted to engage with a part of the vehicle chassis, and means for raising the said chassis part during a bodily substantially horizontal movement of the vehicle and a swinging and relative sliding movement of the jack sections.

6. A vehicle jack, including two slidably connected sections, means for yieldingly resisting a sliding movement tending to shorten the total effective length of the jack, and a member presenting an inclined surface up which the vehicle wheel may roll to shorten the jack to said minimum length and swing the same from an inclined to a vertical position.

7. A portable jack adapted for use in connection with different parts of an automobile, including two slidably connected sections, resilient means resisting shortening movement and a plurality of stops for limiting said sliding shortening movement to different predetermined limits depending upon the desired elevation of the part to be supported by the jack.

8. In combination a member having an inclined surface up which a vehicle wheel may roll, a jack including two telescoping sections and resilient means resisting but permitting limited shortening movement, said jack being adapted to be disposed in an extended inclined position and in engagement with the axle of the wheel to be raised and movable from said inclined to a vertical position and from extended to minimum length during said rolling movement of the wheel and means for preventing the movement of said jack materially passed a vertical position.

9. A vehicle jack adapted to be used in connection with either the front or rear axle of a vehicle and having two slidably connected sections, means resisting but permitting relative sliding movement of said sections, and a pair of stops, one limiting said sliding movement to the desired elevation for the front axle and the other for a different elevation of the rear axle.

Signed at Dedham in the county of Norfolk and State of Massachusetts, this 13th day of December, A. D. 1918.

JOSHUA CRANE.